Sept. 5, 1944.  W. WINDSHEIMER  2,357,787
OUTLET BOX
Filed June 6, 1941
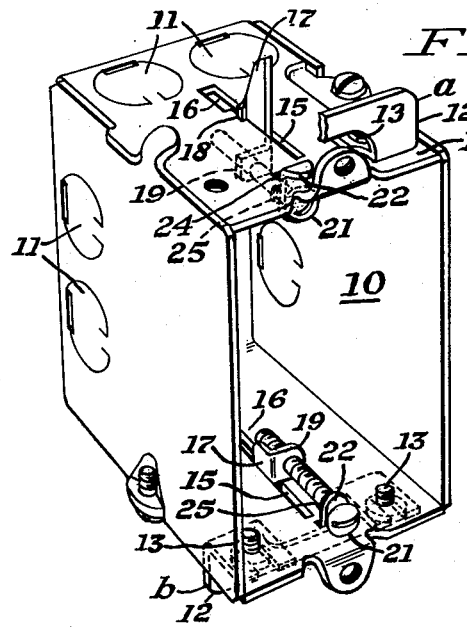
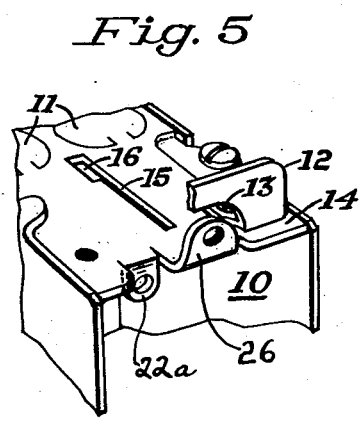
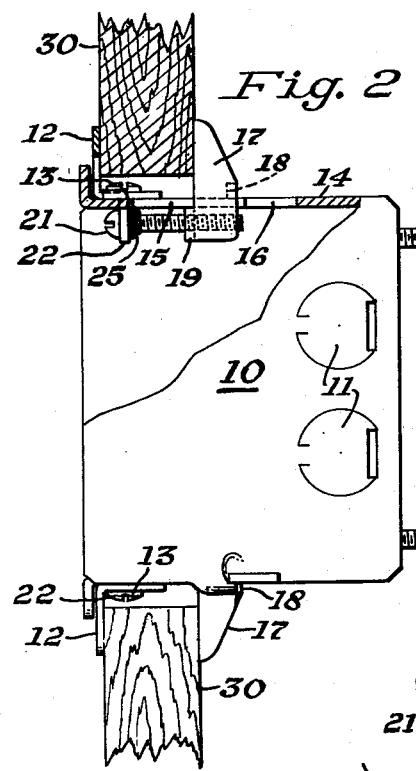
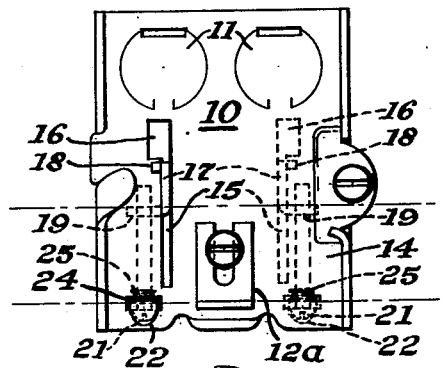
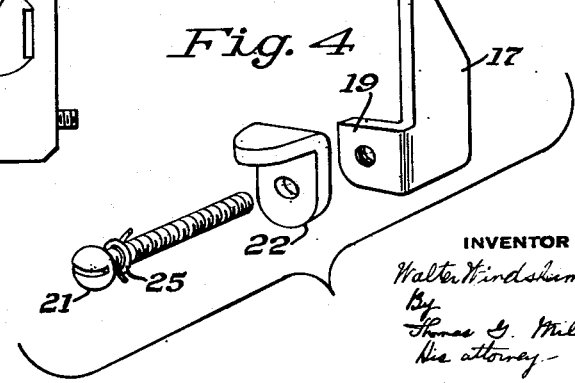
INVENTOR
Walter Windsheimer
By
Thomas G. Miller
His attorney Patented Sept. 5, 1944

2,357,787

UNITED STATES PATENT OFFICE 2,357,787

OUTLET BOX

Walter Windsheimer, Bridgeville, Pa.

Application June 6, 1941, Serial No. 396,865

2 Claims. (Cl. 220—3.3)

This invention pertains to an improved mounting arrangement, and particularly to a new and improved arrangement for outlet boxes adapted to receive suitable electrical apparatus.

In the electrical art it has been customary to employ boxes or receptacles of metal or other suitable material that are adapted to fit into wall portions of a building construction for mounting switches, plugs, sockets, and other electrical apparatus or parts. In boxes of this type, it has been customary to employ an extending lug or bracket at end portions thereof. Suitable wood screws are then positioned to extend through holes in the brackets and to cooperate with adjacent portions of the building construction such as laths, wall boards, etc.

In electrical installations in old homes particularly, the box for enclosing the electrical apparatus or parts is generally mounted on portions of the wall lath. This has been unsatisfactory as it tends to loosen the plaster and also because the laths are not especially strong or secure, and may have been split or weakened in providing a mounting opening for the box. There is danger of splitting the laths as well as the wall board while mounting the screws and difficulty is encountered in mounting the box in such a manner that it will be level; this is necessary if the cover plate is to present the best appearance with respect to the room finish.

In view of the above and other considerations, I set out to develop a mounting arrangement for a box such as above-mentioned that will be foolproof, permanently secured, but suitable for removal, and that will insure a proper and level positioning thereof. Such development has been an object of my invention.

Another object has been to provide a new and improved mounting arrangement for outlet boxes.

A further object has been to provide a mounting arrangement that will facilitate electrical installations both in new and old building structures.

These and many other objects of my invention will appear to those skilled in the art from the drawing, the description, and the claims.

In the drawing:

Figure 1 is a front perspective view of a box embodying my invention;

Figure 2 is a side elevation partly broken away, showing the box of Figure 1 in a mounted position.

Figure 3 is an end plan view of a modified form of box with guide slots offset from a center line of box;

Figure 4 is an enlarged exploded view showing a detail of clamp elements; and

Figure 5 is a broken perspective view of a modified form of bolt mounting part.

In the embodiment of my invention chosen for the purpose of illustration, 10 indicates a somewhat rectangular-shaped box for an electrical installation such as a switch or receptacle. This box in accordance with customary practice is mounted within the confines of a wall, ceiling, or floor of a building construction by sawing out or cutting an opening corresponding substantially to its planar dimensions, in order to receive the box. Conduits or wires are brought in through suitable openings in the usual manner provided by removable lugs 11 in the side and bottom portions of the box. The box 10 is shown provided with a pair of somewhat U-shaped end bracket portions 12 that are removably mounted on opposide sides of the vertical walls 14 by set screws 13. As seen in Figure 1, these brackets 12 can be mounted in one of two positions; where the brackets are positioned as indicated by *a* at the top of Figure 1, they are suitable for mounting on wall board, and where positioned in the reverse position *b*, as shown at the bottom or opposite end of the box, they can be suitably mounted on laths or other inset members of the building construction. Ordinarily the box would be secured by screws inserted through openings in the brackets 12. In accordance with the present invention, ordinary wood screws may, if desired, be eliminated entirely as a positive clamping means is provided.

Referring particularly to Figure 2, it will be seen that each of the end wall portions 14 (top and bottom of Figure 1) of the box 10 is provided with a vertically-extending guide slot 15. The slot 15 is notched or widened at its lower end 16, in order to initially receive an adjustable or slidable clamping dog or finger 17. The finger 17 has a substantially horizontally-extending side lug or projection 18 that follows along the sides of the narrowed portion 15 of the slot to guide it in its upper or clamping movement and to prevent it from turning or dropping out. For a righthand type of clamping screw, see, for example, the screw 21 of the drawing, the "no-turn" lug 18 should extend to the left, or in other words, opposite to the direction of the threads.

The clamping screw or bolt 21 is supported at its upper end by an inwardly extending angle-shaped mount element 22 to extend vertically downwardly within the inside of the box 10 to adjustably retain a horizontally-extending threaded mount angle portion 19 of the finger 17. As shown, the mount element 22 is removably positioned in a horizontally-extending slot 24 cut in the side wall of the box 10 adjacent a top portion thereof or may be formed as an integral part thereof, see Figure 5. In the case of Figure 5, however, the screw 21 is loosely held or positioned within an opening in a mount lug 22a that is integral with an associated side wall 14 and is inwardly pressed out therefrom; the screw-receiving opening must have sufficient diameter or clearance to permit the shank of the bolt or screw to pivot thereabout while the finger 17 is being swung or entered from the inside of the box through the widened portion 16 of the guide slot. The lug 26 is threaded in order to permit the mounting of a conventional form of receptacle thereon; the mount lug 22a is inwardly or vertically offset from the lug 26 to provide clearance for the head of the bolt or screw 21.

I prefer to provide a stop element such as a spring annulus 25 for holding the removable mount or support element 22 in position close to the head of bolt 21 during its insertion in the mount slot 24.

To assemble the clamping structure where the parts 22 and 17 are separately formed from the box, the bolt 21 is pushed through the opening in part 22, the annulus 25 is then moved to press part 22 against the bolt head, and the end of the bolt 21 is initially threaded through the step-like extending portion 19 of the finger 17. The upper support part 22 is then inserted through the slot 24 and the bolt 21 pivots thereabout to swing the finger 17 through the widened portion 16 of the guide slot. Turning the bolt to the right on the righthand threaded type of screw will then cause the finger 17 to slide upwardly along the guide slot 15 and press against the underside of an adjacent portion 30, see Figure 2, of the wall board or lath or other part of the building construction to thereby clamp the building part between the finger 17 and the horizontally-extending bracket 12.

Where the mounting bracket 12 is provided with a centrally-positioned somewhat pivoted type of mount element 12a, see Figure 3, the clamping lug construction may then be positioned to one side of the end portion of the box and diagonally at opposite ends of the box as shown in this modified arrangements. In the claims, where I refer to a switch box, I also include reference to any suitable outlet box, such as used for electrical installations.

It will be apparent to those skilled in the art from the drawing and the description that the same principles are involved in the arrangements and that modifications, additions, and subtractions may be made without departing from the spirit and scope of the invention as indicated by the appended claims. Other suitable shapes of boxes can be employed without departing from the invention.

I claim:

1. An outlet box comprising an open faced box-like receptacle having opposed side walls and opposed end walls, a projecting abutment member secured to the exterior of the two end walls and providing an outwardly extending clamping flange on each end wall, each of the end walls having a slot therein rearwardly of the abutment and extending in a fore-and-aft direction, a clamping finger in the slot movable back and forth along the slot, screw-engaging means on the finger inside the box, and screw means mounted inside the box engaging the screw-engaging means of the finger for moving the finger back and forth, said finger comprising a flat metal member placed edgewise with respect to its direction of travel.

2. An outlet box comprising an open faced box-like receptacle having opposed side walls and opposed end walls, a projecting abutment member secured to the exterior of the two end walls and providing an outwardly extending clamping flange on each end wall, each of the end walls having a slot therein rearwardly of the abutment and extending in a fore-and-aft direction, a clamping finger in the slot movable back and forth along the slot, screw-engaging means on the finger inside the box, and screw means mounted inside the box engaging the screw-engaging means of the finger for moving the finger back and forth, said finger comprising a flat metal member pressed edgewise with respect to its direction of travel, the finger having a lateral projection on one face thereof that extends over the top of the surface of the box at the edge of the slot to prevent the finger from retracting through the slot, the slot being enlarged at one end to enable the finger with its projection to be entered in the slot from the interior of the box after the box has been positioned in the wall.

WALTER WINDSHEIMER.